United States Patent
Malachowsky (10) Patent No.: US 7,729,507 B1
(45) Date of Patent: Jun. 1, 2010

(54) SYSTEM AND METHOD FOR STABILIZING A REAR VIEW IMAGE

(75) Inventor: Chris Alan Malachowsky, Los Altos Hills, CA (US)

(73) Assignee: Nvidia Corporation, Santa Clara, CA (US)

( * ) Notice: Subject to any disclaimer, the term of this patent is extended or adjusted under 35 U.S.C. 154(b) by 957 days.

(21) Appl. No.: 11/292,437

(22) Filed: Dec. 1, 2005

(51) Int. Cl.
G06K 9/00 (2006.01)
H04N 5/228 (2006.01)

(52) U.S. Cl. .................. 382/100; 382/103; 348/208.1; 348/208.99

(58) Field of Classification Search .............. 382/103, 382/100; 348/208.01–208.99
See application file for complete search history.

(56) References Cited

U.S. PATENT DOCUMENTS

| | | | |
|---|---|---|---|
| 7,002,623 B1* | 2/2006 | Ohyama et al. | 348/225.1 |
| 2002/0113873 A1* | 8/2002 | Williams | 348/118 |
| 2004/0070675 A1* | 4/2004 | Fredlund et al. | 348/208.1 |
| 2006/0066728 A1* | 3/2006 | Batur | 348/208.99 |
| 2006/0171007 A1* | 8/2006 | Chen et al. | 359/13 |
| 2006/0227212 A1* | 10/2006 | Schedivy | 348/148 |
| 2006/0232670 A1* | 10/2006 | Chu | 348/118 |
| 2007/0188895 A1* | 8/2007 | Thiel | 359/841 |
| 2008/0136923 A1* | 6/2008 | Inbar et al. | 348/208.2 |

* cited by examiner

Primary Examiner—Wesley Tucker
Assistant Examiner—Randolph Chu (57) ABSTRACT

Embodiments of the present invention include a system for stabilizing a rear view image. The system comprises a camera for capturing a rear view image, wherein the rear view image comprises elements located outside of a passenger vehicle and located behind the passenger vehicle. The system further comprises a motion detector for determining a relative movement between two or more objects e.g., the driver's head and an object within the vehicle. The system further includes an electronic image stabilizer for adjusting the rear view image according to the relative movement and a display device for displaying a stabilized rear view image.

20 Claims, 8 Drawing Sheets

```
RECEIVING A REAR VIEW IMAGE, THE REAR VIEW IMAGE CAPTURED BY A
CAMERA AND COMPRISING ELEMENTS LOCATED OUTSIDE OF A
PASSENGER VEHICLE AND LOCATED BEHIND THE PASSENGER VEHICLE
602
```

```
RECEIVING MOVEMENT INFORMATION, THE MOVEMENT INFORMATION
COMPRISING A RELATIVE MOVEMENT MEASURED BETWEEN TWO OR
MORE OBJECTS
604
```

```
STABILIZING THE REAR VIEW IMAGE ACCORDING TO THE RELATIVE
MOVEMENT
606
```

```
TRANSMITTING THE STABILIZED REAR VIEW IMAGE
608
```

SYSTEM AND METHOD FOR STABILIZING A REAR VIEW IMAGE

FIELD OF THE INVENTION

The present invention is related to the field of motion stabilization. More specifically, embodiments of the invention are directed to stabilizing a rear view image from a vehicle.

BACKGROUND ART

Rear view mirrors are an essential safety component that can be found in virtually every passenger vehicle. A rear view mirror provides an image of elements behind the vehicle. A driver can glance at the rear view mirror to check for hazards behind the vehicle without actually turning his/her head around. A rear view mirror is a safe and convenient tool for checking the surroundings of a passenger vehicle while maintaining concentration on the front view of the vehicle.

Typically, a rear view mirror is mounted to or near the top of the windshield of a passenger vehicle. At times, vibrations transmitted through the mirror itself can distort the image in the rear view mirror. These vibrations can come from uneven surfaces on the road, noise from the vehicle itself, noise from the radio, etc. The vibrations can be so severe that the rear view image becomes blurred, which diminishes the usefulness of the rear view mirror.

Also, motion of the vehicle can cause the driver's head and body to move. This motion combined with the rear view mirror vibration described above, can significantly blur and distort the projected rear view image.

SUMMARY OF THE INVENTION

Accordingly, a system and method for stabilizing a rear view image would be an advantage. Embodiments of the present invention include a system for stabilizing a rear view image. In one embodiment of the invention, the system comprises a camera for capturing a rear view image, wherein the rear view image comprises elements located outside of a passenger vehicle and located behind the passenger vehicle. The system further comprises a motion detector for determining a relative movement between two or more objects. The system further includes an electronic image stabilizer for adjusting the rear view image according to the detected relative movement and a display device for displaying a stabilized rear view image, e.g., for viewing by the driver of the vehicle.

Embodiments of the present invention also include an image processing system. The system comprises a first input for receiving a captured rear view image, wherein the rear view image comprises elements located outside of a passenger vehicle and located behind the passenger vehicle. The system further comprises a second input for receiving movement information, wherein the movement information includes a relative movement between two or more objects and an electronic image stabilizer coupled to the first input and the second input for generating a stabilized rear view image according to the relative movement. The system further includes an output coupled to the electronic image stabilizer for transmitting the stabilized rear view image.

Embodiments of the present invention further include a computer implemented method for stabilizing an image, the method comprises receiving a rear view image, wherein the rear view image is captured by a camera and comprises elements located outside of a passenger vehicle and located behind the passenger vehicle. The method further includes receiving movement information, wherein the movement information comprises a relative movement measured between two or more objects. The method further includes stabilizing the rear view image according to the relative movement and transmitting the stabilized rear view image. In one embodiment of the invention, the image stabilizer makes the image appear stable to the observer even though both the observer and the display are potentially moving relative to each other.

Embodiments of the present invention further include a system for stabilizing a rear view image comprising a head position sensor for determining movement of a driver's head, for example. The head position information is used to adjust the displayed image such that the relative movement between the driver's head and the displayed image is reduced. In one embodiment of the invention, the display device comprises a mechanical damper which is controlled based on the driver's head position and is adjusted such that the relative motion between the driver's head and the display device is reduced. In another embodiment of the invention, a mechanical damper is coupled to a camera system and a motion detector is used to determine the motion of the vehicle itself. The vehicle motion information is used to control the mechanical damper coupled to the camera such that the relative motion between the camera and objects outside the vehicle (e.g., other cars on the road) is reduced.

BRIEF DESCRIPTION OF THE FIGURES

The accompanying drawings, which are incorporated in and form a part of this specification, illustrate embodiments of the present invention and, together with the description, serve to explain the principles of the invention.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "receiving," "displaying," "retrieving," "stabilizing," "generating," "capturing," "decrementing," "accessing," "processing," "maximizing," "allocating," "treating," "overriding" or the like, refer to actions and processes (e.g., flowchart 600 of FIG. 6) that may partially or totally be performed on a computer system or similar electronic computing device or processor. The computer system or similar electronic computing device manipulates and transforms data represented as physical (electronic) quantities within the computer system memories, registers or other such information storage, transmission or display devices.

Embodiments of the present invention include a system for stabilizing a rear view image. In one embodiment of the invention, a camera is used to capture an image behind and outside a vehicle. In one embodiment of the invention, an electronic image stabilizer (e.g., graphics processor) is used to stabilize the image and then the stabilized image is displayed on a display device. In one embodiment of the invention, the display device is configured to look like a conventional rear view mirror and is mounted to an inside surface of a windshield of a passenger vehicle. In one embodiment of the invention, head movement (e.g., head position relative to another object) of the driver is considered when stabilizing the image. In another embodiment of the invention, a combination of electronic (e.g., processor based) and mechanical (e.g., gyroscope) stabilizers are used to stabilize the rear view image. In one embodiment of the invention, a heads up display is used to display the image on the windshield, for example.

Figure 1:
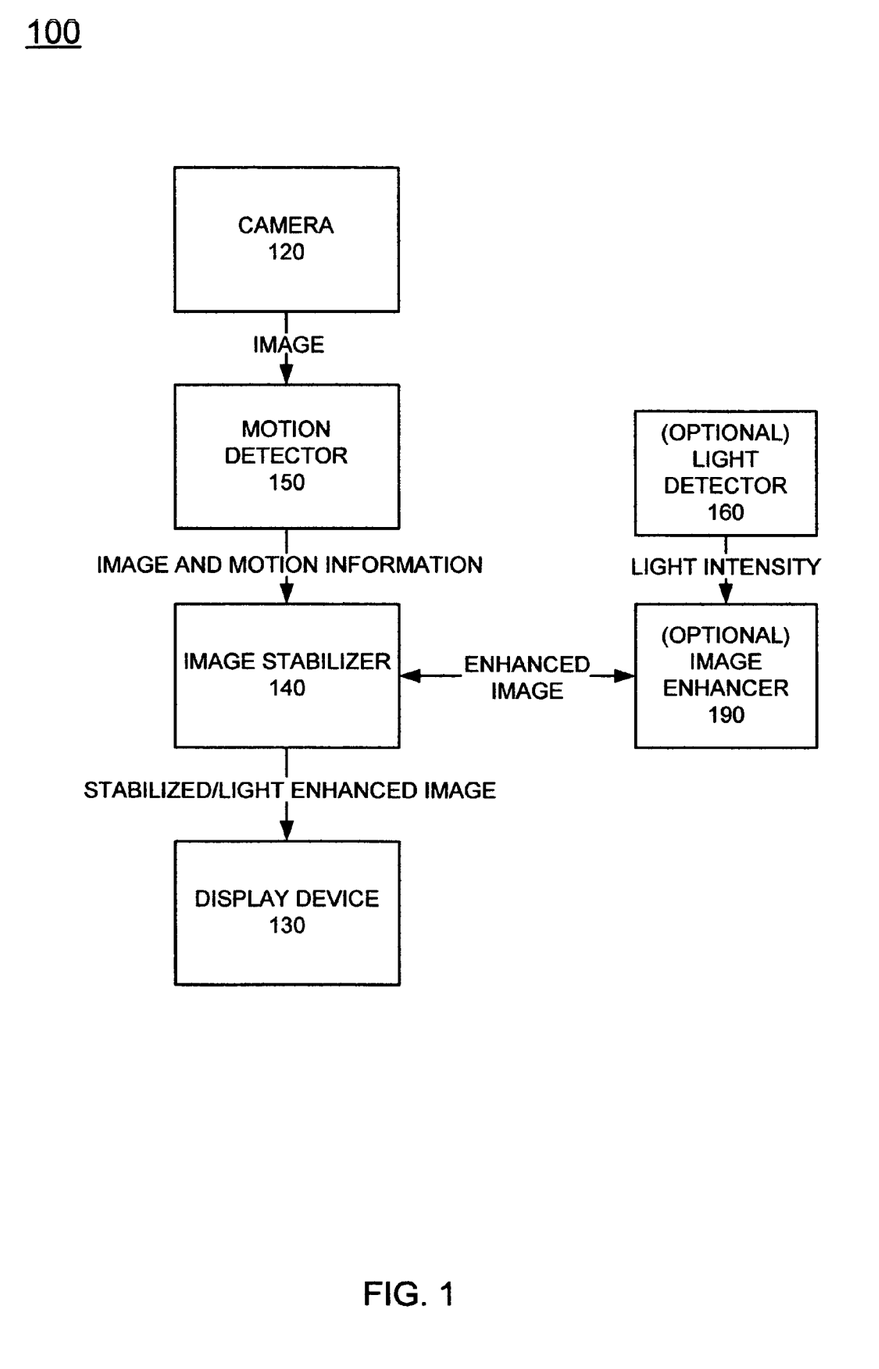
FIG. 1 is a block diagram of an exemplary system for stabilizing a rear view image including an optional light detector in accordance with embodiments of the present invention.

FIG. 1 is a block diagram of an exemplary system 100 for stabilizing an image in accordance with embodiments of the present invention. System 100 includes a camera 120. In one embodiment of the invention, camera 120 is a digital camera or may also be a video camera. It is appreciated that camera 120 may be any device known in the art for capturing an image. System 100 further includes a motion detector 150. In one embodiment of the invention, motion detector 150 measures inertia to determine movement e.g., movement of the vehicle. In one embodiment of the invention, motion detector 150 includes a gyroscope and or accelerometer to measure movement. In another embodiment of the invention, motion detector 150 uses a laser to measure movement. However, it is appreciated that any techniques known in the art for measuring movement can be implemented in accordance with embodiments of the present invention. In one embodiment of the invention, the detected movement is the movement of the vehicle with respect to the road (or other objects outside the vehicle). In another embodiment of the invention, the detected motion is that of the driver (e.g., driver's head) within the vehicle.

System 100 further includes an image stabilizer 140. In one embodiment of the invention, the image stabilizer 140 includes a graphics processor for modifying a digital image captured from the camera 120 according to the motion detected by motion detector 150 so that the image appears stabilized with respect to the driver. The system 100 further includes a display device 130 for displaying the stabilized image generated by the image stabilizer 140. In one embodiment of the invention, the display device 130 is configured to resemble a rear view mirror of a passenger vehicle and may be positioned in such a location for easy viewing. In one embodiment of the invention, the image is adjusted such that it appears to not be moving even if the passenger vehicle is vibrating and/or the driver is moving.

In one embodiment of the invention, the system 100 further includes an optional light detector 160. The light detector 160 measures the intensity of light of the image captured by the camera 120. In one embodiment of the invention, an optional image enhancer 190 enhances the image according to the light intensity. For example, in low light conditions, the image enhancer 190 enhances images similar to a night vision system. In another embodiment of the invention, in intense light conditions (e.g., headlight glare) the image enhancer reduces glare in the image.

Figure 2:
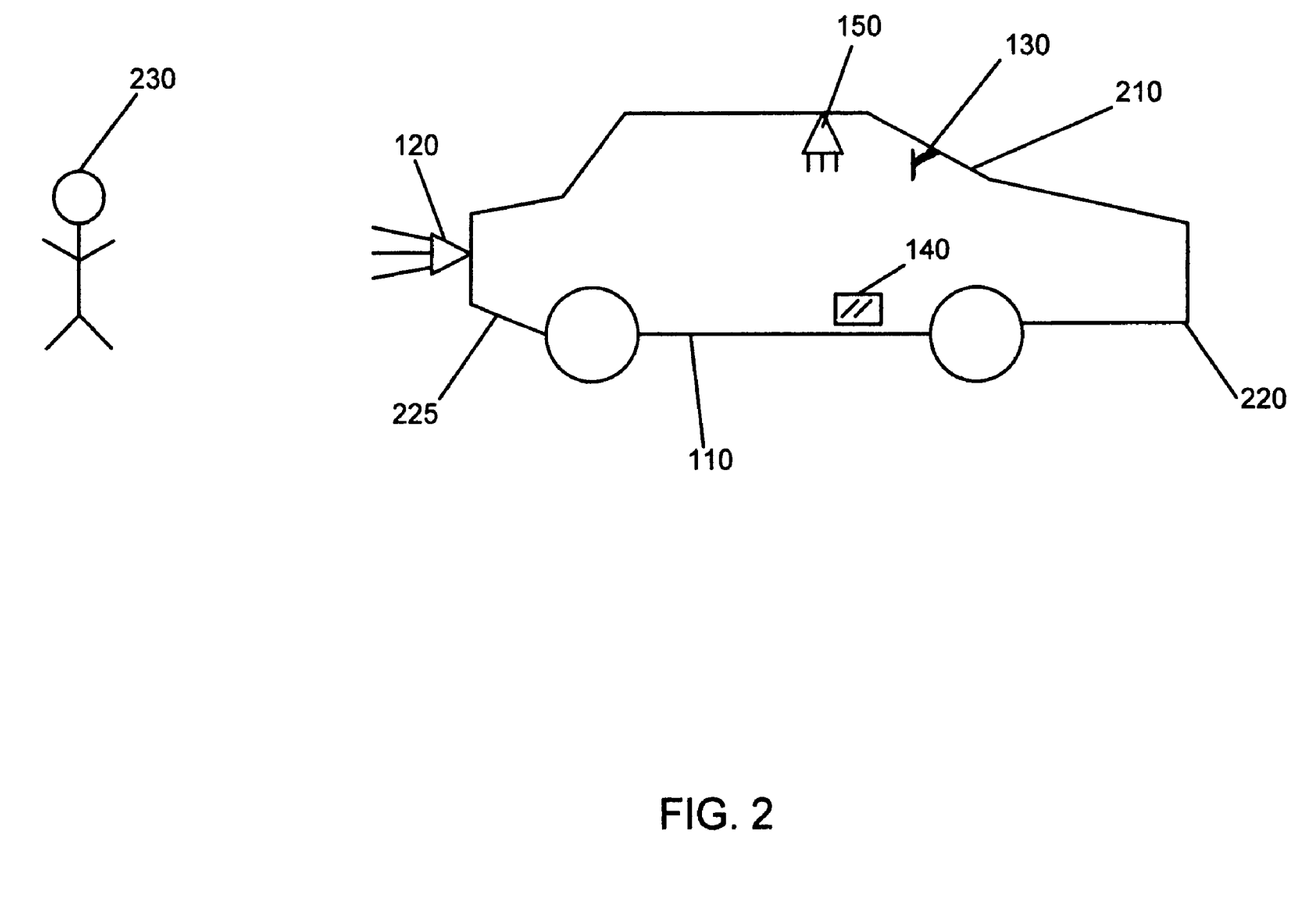
FIG. 2 is an illustration of a passenger vehicle with an exemplary system for stabilizing a rear view image in accordance with embodiments of the present invention.

FIG. 2 is an illustration of a passenger vehicle with an exemplary system for stabilizing a rear view image in accordance with embodiments of the present invention. In one embodiment of the present invention, camera 120 may be mounted to a passenger vehicle 110. In one embodiment of the invention, the passenger vehicle can be an automobile, a boat, and airplane, a motorcycle or any other passenger vehicle. In one embodiment of the invention, the camera is mounted such that it captures images from the back or rearward end 225 of the passenger vehicle 110. In this embodiment of the invention, the camera faces rearward with respect to the front 220 of the passenger vehicle 110 and captures images of an object 230 behind the vehicle 110. In one embodiment of the invention, the camera 120 is outside the vehicle, however, it is appreciated that the camera 120 could also be mounted inside of the vehicle 110.

A motion detector 150 is mounted inside the passenger vehicle 110. In one embodiment of the invention, the motion detector 150 determines motion of an object inside of the vehicle, for example, the position of a driver's head can be monitored. In one embodiment of the invention, the display device 130 is mounted to the inside surface of the windshield 210. In this embodiment of the invention, the display device replaces a conventional rear view mirror. An image stabilizer 140 processor is coupled the camera 120 feed and receives images from the camera 120. The image stabilizer 140 is also coupled to the motion detector 150 and receives motion information from the motion detector 150. The image stabilizer 140 is also coupled to the display device 130 and outputs a stabilized image to the display device 130 so that the image is relatively stabilized with respect to the driver, for example. It is appreciated that the camera 120, image stabilizer 140, motion sensor 150 and display 130 can be inside or outside the vehicle.

High speed image stabilizer 140 may be an embedded processor or any computer processor and/or system that are well known in the digital arts for performing digital image stabilization based on an input image and motion detection. The output of the processor 140 may be a digital or video signal. It is appreciated that the image stabilization process may be implemented in hardware or software. In one embodiment of the invention, device 140 may include one or more graphics processing units (GPUs). In one embodiment of the invention, a graphic processing unit includes a processor, an image processor and image stabilizer.

In one embodiment of the invention, a plurality of cameras and displays are used in accordance with embodiments of the invention. For example, a combination of cameras and displays can be used to capture a rear view image, a passenger side view image and a driver side view image. These images can then be stabilized and displayed on a plurality of displays. In one embodiment of the invention, more than one displays are mounted in the locations of conventional mirrors. For example, one display can be located on the driver's side and one can be located on the passenger side to replace conventional side view mirrors.

Figure 3:
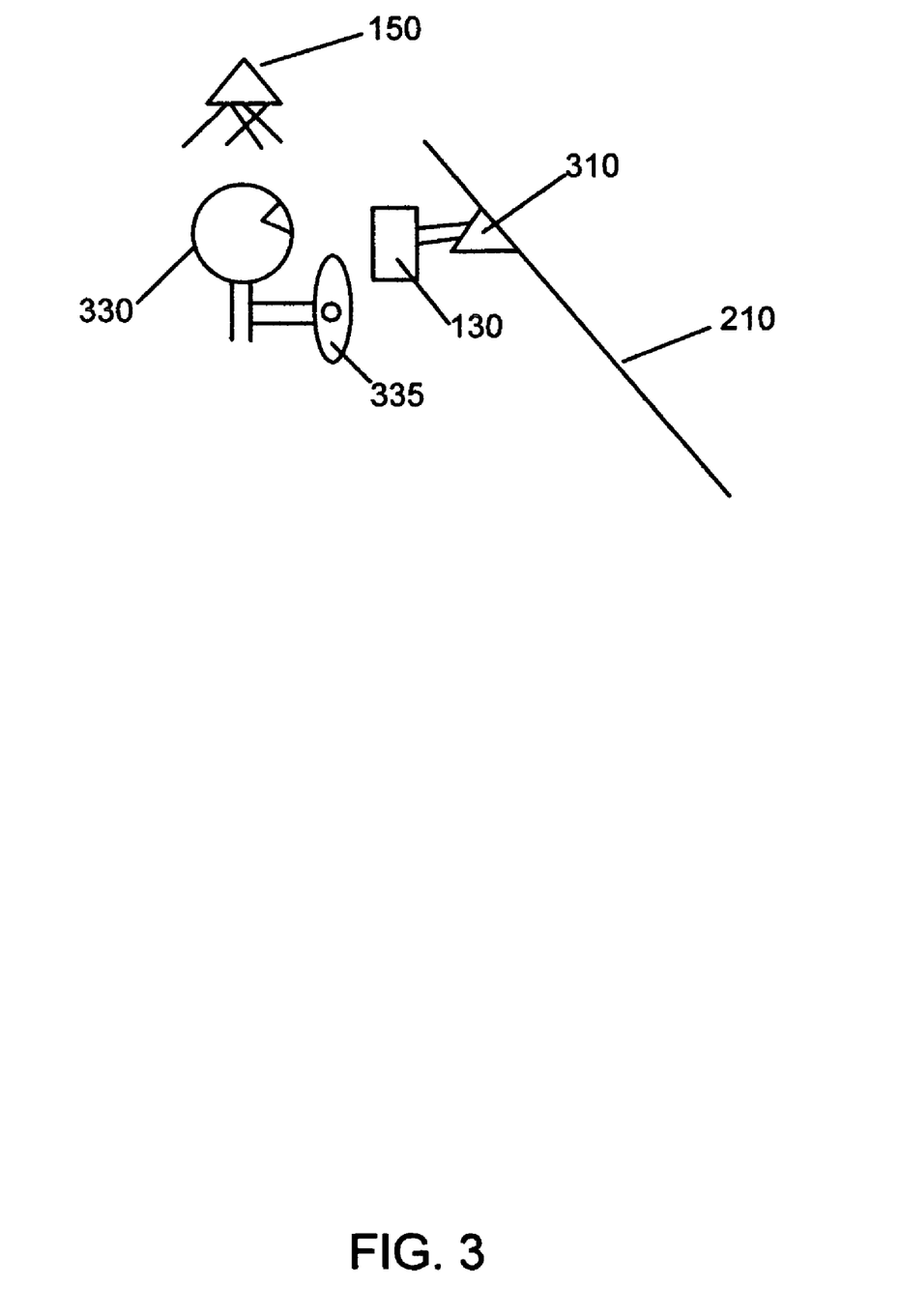
FIG. 3 is an illustration of an exemplary system for stabilizing a rear view image mounted to an inside surface of a windshield in accordance with embodiments of the present invention.

FIG. 3 is an illustration of an exemplary system for stabilizing a rear view image mounted to an inside surface of a windshield 210 in accordance with embodiments of the present invention. In one embodiment of the invention, a vibration damper 310 is coupled between the display device 130 and the inside surface of the windshield 210 for vibration damping. In one embodiment of the invention, the damper 310 comprises a gyroscope for determining motion and for stabilizing the display device 130. In another embodiment of the invention, a laser is used to determine movement. The damping may also be mechanical, e.g., spring based, fluid based, etc. It is appreciated that any systems for damping motion can be used in accordance with embodiments of the present invention.

In one embodiment of the invention, device 130 is a mirror. The motion detector 150 determines movement (e.g., of the driver's head). The damping device 310 adjusts the position of the mirror 130 according to the motion detected by sensor 150. In one embodiment of the invention, processor 140 of FIG. 2 controls the damping device 310, however, in another embodiment of the invention, the damping device 310 directly receives the movement data from the sensor 150.

In one embodiment of the invention, the motion sensor 150 is positioned such that it can determine the position (movement) of a driver 330. The display device 130 is positioned in front of the driver 330 and in one embodiment of the invention, above the steering wheel 335. The positioning of the display device is such that the driver 330 can maintain a forward view position and still see rear view images in the display device 130. In one embodiment of the invention, the damping device 310 can adjust the position of the display device 130 such that the relative movement between the driver 330 and the display device 130 is reduced. By reducing the relative movement between the display device 130 and the driver 330, the driver can more clearly view the display device 130. In one embodiment of the invention, the displayed image modes according to the driver's head movement such that the image appears to be stable (with respect to the driver).

Figure 4:
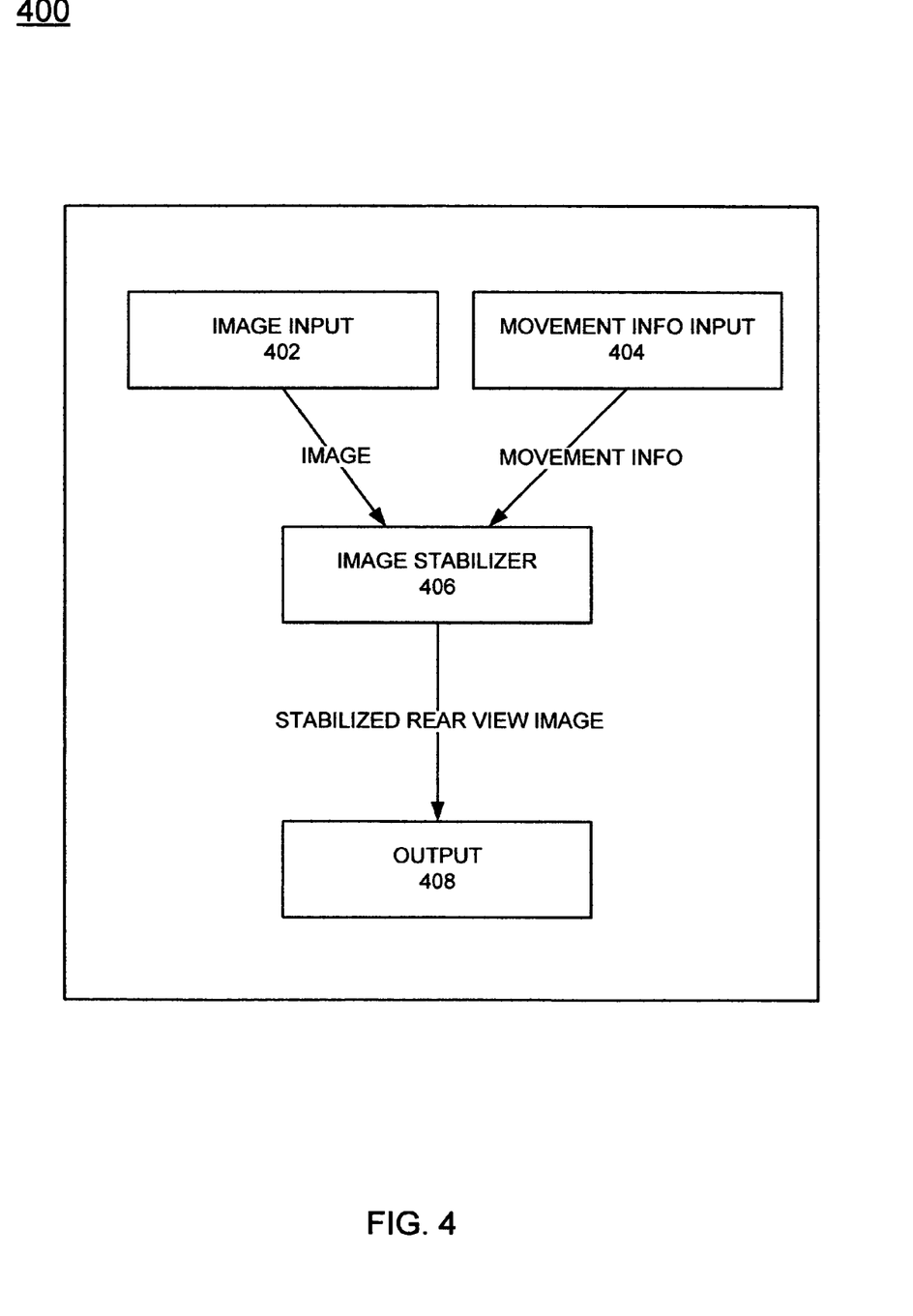
FIG. 4 is a block diagram of an exemplary image processor for stabilizing an image in accordance with embodiments of the present invention.

FIG. 4 is a block diagram of an exemplary image processor 400 for stabilizing an image in accordance with embodiments of the present invention. In one embodiment of the invention, the image processor 400 includes an image input 402 for receiving an image from camera 130 of FIG. 1, for example. The image processor 400 further includes a movement information input 404 for receiving movement information from motion detector 150 of FIG. 1, for example. The image processor 400 further includes an image stabilizer 406 for stabilizing the image from image input 402 and adjusting the image according to the motion information received at the motion information input 404. Device 406 may be a high speed graphics processor unit (GPU) or it may be implemented in software. The image processor 400 further includes an output for transmitting the stabilized image generated by the image stabilizer 406. In one embodiment of the invention, one or more of the image input 402, movement information input 404 and output 408 receives/transmits information wirelessly.

Figure 5:
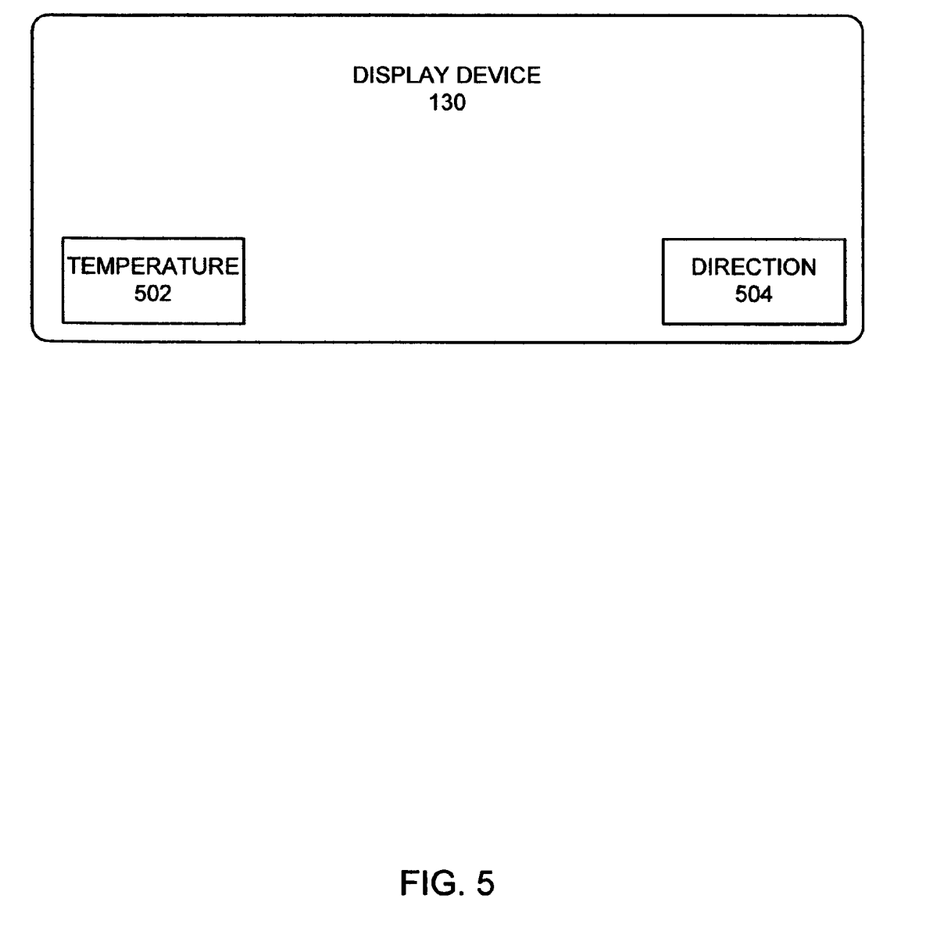
FIG. 5 is an exemplary display device for displaying a stabilized rear view image in accordance with embodiments of the present invention.

FIG. 5 is an exemplary display device for displaying a stabilized rear view image in accordance with embodiments of the present invention. In one embodiment of the invention, the display device 130 comprises a temperature display 502. In this embodiment of the invention, temperature information can be accessed from a temperature sensor (not shown). The temperature indicator 502 can display the temperature inside or outside of the vehicle. In another embodiment of the invention, the display device further comprises a direction indicator for displaying the direction the car is pointing.

Figure 6:
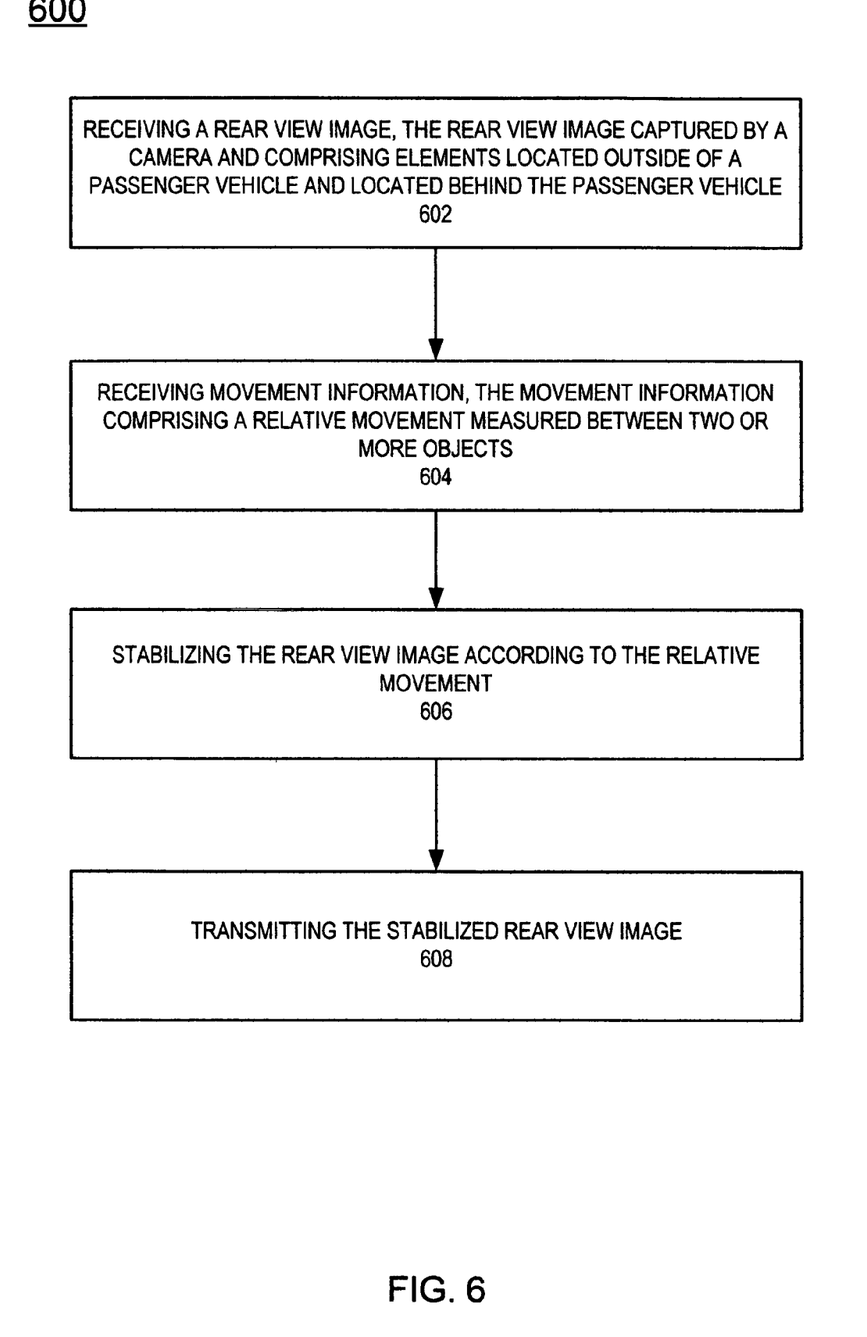
FIG. 6 is a flow diagram of an exemplary method for stabilizing an image in accordance with embodiments of the present invention.

FIG. 6 is a flow diagram of an exemplary method 600 for stabilizing an image in accordance with embodiments of the present invention. At step 602, method 600 includes receiving a rear view image, wherein the rear view image is captured by a camera and comprises elements located outside a passenger vehicle and behind the passenger vehicle. As stated above, the passenger vehicle can be any vehicle such as a car, truck, motorcycle, boat, airplane, etc. In one embodiment of the invention, in step 602, a plurality of images are received from a plurality of cameras.

At step 604, method 600 includes receiving movement information, wherein the movement information comprises a relative movement measured between two or more objects. In one embodiment of the invention, a plurality of movement sensors are used and a plurality of movement measurements are received in step 604. In one embodiment of the invention, a gyroscope is used to measure movement. In another embodiment of the invention, a laser is used to determine movement. In another embodiment of the invention, image processing can be used to determine movement between two or more objects. In one embodiment of the invention, the movement measured is between a driver of a passenger vehicle and another object, such as display device 130 of FIG. 1.

At step 606, method 600 includes stabilizing the rear view image according to the relative movement determined in step 604. In one embodiment of the invention, the image is stabilized by physically moving a display device (e.g., display device 130 of FIG. 1) according to the movement such that the display appears to be static with respect to another object (e.g., the driver). In another embodiment of the invention, the image is electronically processed to stabilize the image such that it appears to be static with respect to another object (e.g., the driver).

At step 608, method 600 includes transmitting the stabilized image. In one embodiment of the invention, the image is transmitted to a display device or plurality of display devices. In one embodiment of the invention, the stabilized image is transmitted wirelessly.

Figure 7:
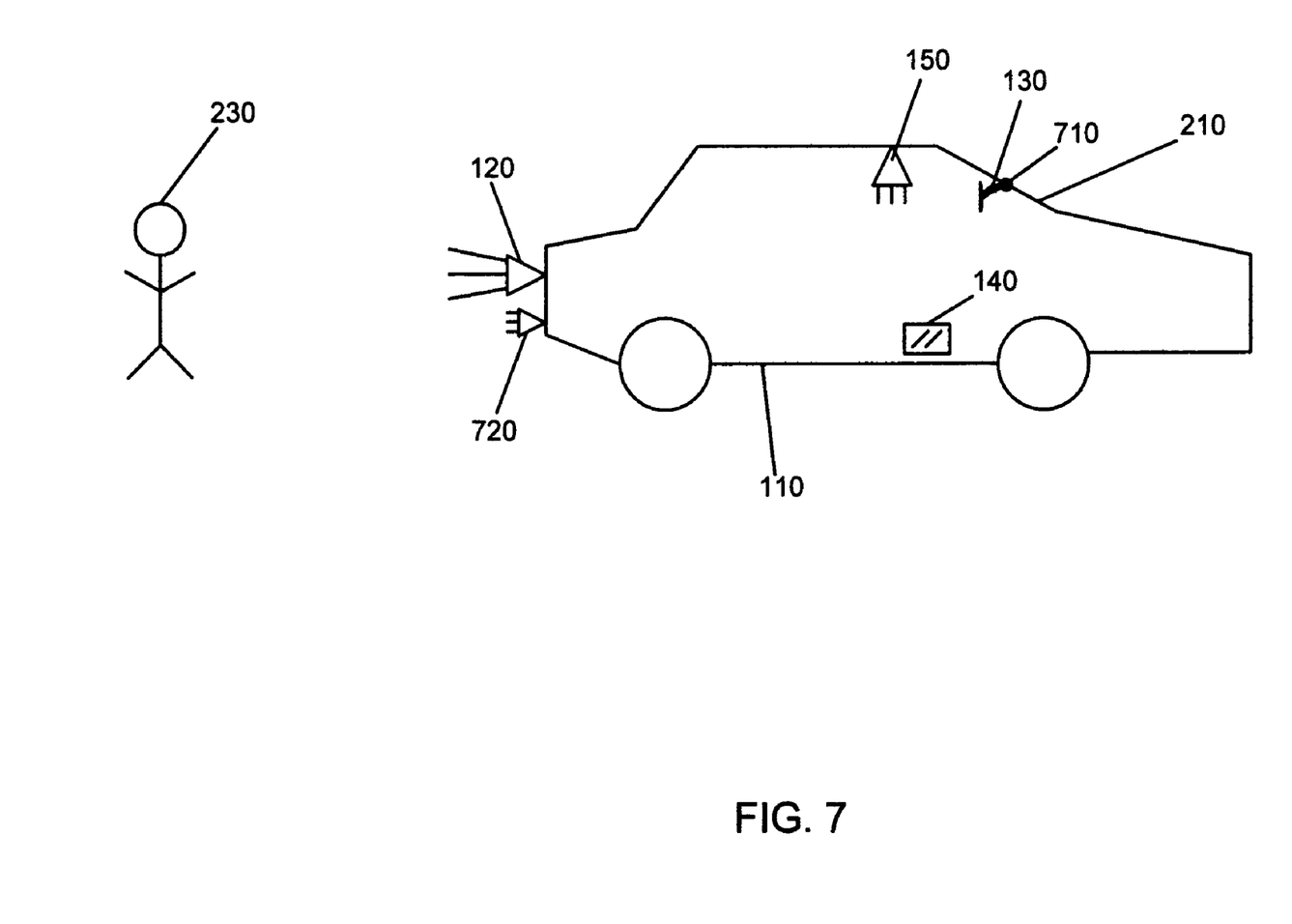
FIG. 7 is an illustration of an exemplary system for stabilizing an image including a plurality of motion detectors in accordance with embodiments of the present invention.

FIG. 7 is an illustration of an exemplary system for stabilizing an image including a plurality of motion detectors in accordance with embodiments of the present invention. In one embodiment of the invention, a first motion sensor 720 is used to determine a movement between an object 230 outside the passenger vehicle 110 and the camera 120, for example. An image processor 140 receives both the image from the camera 120 and the first motion sensor. A second motion sensor 150 is used to determine a relative motion between the display device 130 and a driver of the vehicle (not shown). The movement information from the second motion detector 150 is used by motion adjuster 710 to physically adjust the position of the display, for example. The display can be adjusted such that the relative motion between the display and the driver is reduced, making the display easier to view. In one embodiment of the invention, the image stabilizer 140 receives the motion information from the second motion detector 150 and drives a motor controlling the position of the display 130. In another embodiment of the invention, the motion adjuster 710 directly receives the motion information from motion detector 150 and adjusts the position of the display accordingly.

In one embodiment of the invention, a damper device (not shown) serves as a mount for camera 120 to the vehicle 110. In one embodiment of the invention, sensor 720 determines motion of the vehicle 110 with respect to an object 230 outside the vehicle. The movement information is then used to control the damper between the camera 120 and the vehicle 110 to damp the movement of the vehicle 110. In one embodiment of the invention, the damper between the camera 120 and the vehicle 110 includes a gyroscope or accelerometer to measure movement directly. In one embodiment of the invention, the camera 120 stabilizes the image captured by cropping the field of view such that the image is stabilized.

It is appreciated that in one embodiment of the invention, the cameras and sensors can be done stereoscopically to display a three-dimensional image portraying depth to further aid interpreting an image. Furthermore, edge detection can be used to highlight movement or structures in the displayed image.

Figure 8:
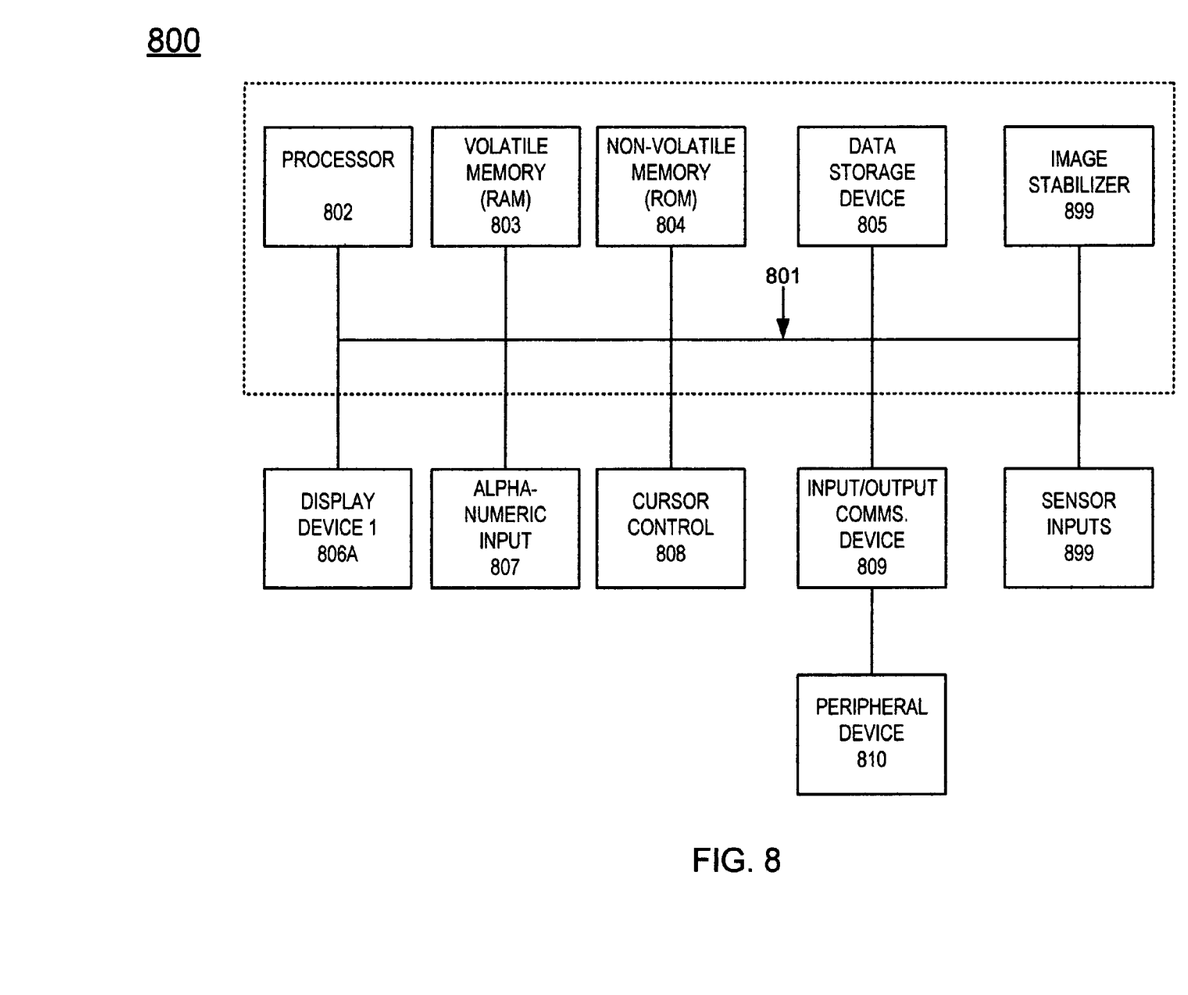
FIG. 8 is a block diagram of exemplary computer system in accordance with embodiments of the present invention.

Referring now to FIG. 8, a block diagram of exemplary computer system 800 is shown. It is appreciated that computer system 800 of FIG. 8 described herein illustrates an exemplary configuration of an operational platform upon which embodiments of the present invention can be implemented. Nevertheless, other computer systems with differing configurations can also be used in place of computer system 800 within the scope of the present invention. For example, computer system 800 could be a graphics processor, a vehicle control system, or an embedded computer system such as a global positioning system or audio/video system. Furthermore, computer system 800 could be a multiprocessor computer system.

Computer system 800 includes an address/data bus 801 for communicating information, a central processor 802 coupled with bus 801 for processing information and instructions, a volatile memory unit 803 (e.g., random access memory, static RAM, dynamic RAM, etc.) coupled with bus 801 for storing information and instructions for central processor 802 and a non-volatile memory unit 804 (e.g., read only memory, programmable ROM, flash memory, EPROM, EEPROM, etc.) coupled with bus 801 for storing static information and instructions for processor 802. Computer system 800 may also contain optional display devices 806a coupled to bus 801 for displaying information to the computer user. Moreover, computer system 800 also includes a data storage device 805 (e.g., disk drive) for storing information and instructions. System 800 also includes an image stabilizer 899 coupled to bus 801.

Also included in computer system 800 of FIG. 8 is an optional alphanumeric input device 807. Device 807 can communicate information and command selections to central processor 802. Computer system 800 also includes an optional cursor control or directing device 808 coupled to bus 801 for communicating user input information and command selections to central processor 802. Computer system 800 also includes signal communication interface 809, which is also coupled to bus 801, and can be a serial port. Communication interface 809 can also include number of wireless communication mechanisms such as infrared or a Bluetooth protocol. Peripheral device 810 is coupled to bus 801 and can be a motion sensor, a camera, a temperature sensor, or any other peripheral device in accordance with the present invention. In one embodiment of the invention, a sensor input 899 is used to couple to a sensor device.

Embodiments of the present invention, a system and method for stabilizing a rear view image have been described. While the present invention has been described in particular embodiments, it should be appreciated that the present invention should not be construed as limited by such embodiments, but rather construed according to the following Claims.

What is claimed is:

1. A system for stabilizing an image comprising:
   a camera for capturing a rear view image comprising a field of view directed outside of a vehicle and to its rear;
   a first motion detector determining a first relative movement between said first motion detector and a first object disposed within said vehicle,
   a second motion detector determining a second relative movement between said second motion detector and a plurality of objects disposed outside of said vehicle and disposed in said field of view;
   an electronic image stabilizer coupled to said first motion detector, said second motion detector, and said camera and for adjusting said rear view image according to said first relative movement and said second relative movement; and
   a display device for displaying a stabilized rear view image for viewing by a driver of said vehicle.

2. The system as described in claim 1 wherein said display device is mounted to an inside surface of a windshield of said vehicle.

3. The system as described in claim 2 further comprising a damping device disposed between said display device and said inside surface of said windshield.

4. The system as described in claim 2 wherein said display device is configured to resemble a rear view mirror in size and shape.

5. The system as described in claim 1 wherein said first object comprises said vehicle, and said first relative movement is measured between said vehicle and said first motion detector.

6. The system as described in claim 1 wherein said electronic image stabilizer comprises a graphics processor unit.

7. An image processing system comprising:
   a first input for receiving a captured rear view image, said rear view image comprising a field of view directed outside of a passenger vehicle and to its rear;

a second input for receiving movement information comprising a first relative movement between a first motion detector and a first object disposed within said passenger vehicle;

a third input for receiving movement information comprising a second relative movement between a second motion detector and a plurality of objects disposed outside of said passenger vehicle and disposed in said field of view;

an electronic image stabilizer coupled to said first input, said second input, and said third input for generating a stabilized rear view image according to said first relative movement and said second relative movement; and an output coupled to said electronic image stabilizer for transmitting said stabilized rear view image for displaying to a driver of said passenger vehicle.

8. The image processing system as described in claim 7 further comprising a display device coupled to said output and for displaying said stabilized rear view image.

9. The image processing system as described in claim 8 wherein said display device is coupled to said output by a wireless connection.

10. The image processing system as described in claim 8 wherein said display device is shaped and sized to resemble a rear view mirror.

11. The image processing system as described in claim 8 wherein said first object comprises a driver of said passenger vehicle, and said relative movement is measured between said driver of said passenger vehicle and said first motion detector.

12. The image processing system as described in claim 7 wherein said second input comprises input from a gyroscope.

13. The image processing system as described in claim 7 further comprising a projector device coupled to said output.

14. The image processing system as described in claim 13 wherein said projector device projects said stabilized image on a surface of a windshield of said passenger vehicle.

15. The image processing system as described in claim 7 further comprising:

a fourth input for receiving a light intensity value; and an image enhancer for enhancing said stabilized rear view image according to said light intensity value.

16. A computer implemented method for stabilizing an image comprising:

receiving a rear view image, said rear view image captured by a camera and comprising a field of view directed outside of a passenger vehicle and to its rear;

receiving movement information comprising a first relative movement measured between a first motion detector and a first object disposed within said passenger vehicle;

receiving movement information comprising a second relative movement measured between a second motion detector and a plurality of objects disposed outside of said passenger vehicle and disposed in said rear view image;

stabilizing said rear view image according to said first relative movement and said second relative movement; and transmitting said stabilized rear view image for display to a driver of said passenger vehicle.

17. The method as described in claim 16 wherein said transmitting further comprises:

transmitting said stabilized rear view image to a display device, said display device coupled to an inside surface of a windshield of said passenger vehicle.

18. The method as described in claim 17 wherein said transmitting is performed wirelessly.

19. The method as described in claim 17 wherein said display device is configured to resemble in shape and size a rear view mirror.

20. The method as described in claim 17 further comprising:

receiving a light intensity value, wherein said stabilizing said rear view image comprising stabilizing said rear view image according to said first relative movement, said second relative movement, and said light intensity value.

* * * * *